United States Patent [19]

Balukin et al.

[11] 4,181,369
[45] Jan. 1, 1980

[54] PNEUMATIC/ELECTRO-PNEUMATIC BRAKE CONTROL SYSTEM WITH INTERLOCK CIRCUITRY FOR PUSH/PULL TRAIN OPERATION

[75] Inventors: Richard F. Balukin, Penn Hills; John R. Reiss, N. Versailles, both of Pa.

[73] Assignee: Westinghouse Air Brake Company, Wilmerding, Pa.

[21] Appl. No.: 973,349

[22] Filed: Dec. 26, 1978

[51] Int. Cl.² .............................................. B60T 13/68
[52] U.S. Cl. ........................................ 303/16; 303/20
[58] Field of Search ............................. 303/13, 15–17, 303/20

[56] References Cited

U.S. PATENT DOCUMENTS 3,901,558  8/1975  Burkett ................................. 303/16

Primary Examiner—Stephen G. Kunin
Attorney, Agent, or Firm—R. W. McIntire, Jr.

[57] ABSTRACT

A pneumatic/electro-pneumatic brake control system including an interface unit at each control station at the opposite ends of a train operating in push/pull service. This interface unit includes a plurality of pressure switches for sensing the operating condition of the brake valve at the respective control station in order to effect an electro-pneumatic brake application on the train via an application relay in bypass of the master controller, when the brake valve is cut out, thereby permitting the operator to leave the train with the brakes safely applied while changing control stations. The arrangement is such as to permit this brake application to be released at the time the operator boards the train at the opposite control station by cutting in the brake valve thereat and moving the brake valve handle to release position to energize the release train-line wire via the master controller at the new control station.

8 Claims, 2 Drawing Figures

PNEUMATIC/ELECTRO-PNEUMATIC BRAKE CONTROL SYSTEM WITH INTERLOCK CIRCUITRY FOR PUSH/PULL TRAIN OPERATION

BACKGROUND OF THE INVENTION

The present invention is related to pneumatic/electro-pneumatic brake control systems for railway service and particularly to such systems in which a railway train is operating in push/pull service; i.e., where a train of cars have a locomotive at one end and a control cab at the other end from which the locomotive may be operated.

It will be appreciated that in push/pull type service, the train operator is required to change his control station at the end of a run and prior to beginning the return trip. It will also be appreciated that for safety purposes, the train brakes should be applied and maintained during the time the operator is changing ends and until such time as the operator releases the brakes after changing control stations.

There has been previously disclosed in U.S. Pat. No. 3,901,558, issued Aug. 26, 1975 and assigned to the assignee of the present invention a pneumatic/electro-pneumatic interlock brake control system arranged specifically for double-end control of a locomotive, as opposed to push/pull service. In this particular arrangemenet, it will be seen that a considerable number of wires are connected between the control stations at the opposite ends of the locomotive. This prior art system has the ability to maintain a brake application on the train while the operator changes from one control station to another and to release the brake application upon arriving at the other control station, but because of the required wiring interconnecting the respective interlock circuits between control stations, is unsuitable for application in push/pull service, since it would be impractical to run the wiring through the intervening cars between the control stations at opposite ends of the train.

SUMMARY OF THE INVENTION

It is an object of the present invention to provide a pneumatic/electro-pneumatic brake control system having interlock circuitry for sensing the cut-out and cut-in condition of the pneumatic brake valve, as an indication of the operator leaving and returning to the train in the process of changing control stations, for example, to accordingly effect a brake application and subsequent release of the brake application without requiring any train-line wires in addition to the conventional train-line wires.

In carrying out this objective, the present invention includes, in addition to a conventional brake valve device at each control station, such as may be provided by the control cars or locomotives at opposite ends of a train operating in push/pull service, an identical interface unit at each control station comprising interlock circuitry and a master controller device. The master controller senses pressure differentials between brake pipe and equalizing reservoir pressures, which in turn vary in accordance with operation of the operator-controlled brake valve device. Application and release switches associated with the master controller are actuated with movement of the master controller in accordance with the preponderance of the brake pipe/equalizing reservoir pressure differential to control energization of application and release train-line wires to which electromagnetic valves on each car are connected to instantaneously duplicate at the respective cars the brake control initiated by the brake valve device. In the present invention, such brake control is produced in accordance with variation of brake pipe pressure, in response to which, car-carried control valves operate to produce application and release of brake pressure.

The interlock circuitry of each interface unit includes application and release relays having contacts via which power is connected to the respective application and release train-line wires when the relays are energized. During normal operation, these application and release relays are energized in accordance with operation of the master controller, which is in turn piloted in response to operation of the brake valve at the activated control station. During such normal operation, a first pressure switch senses the cut-in condition of the brake valve at the activated control station to control the connection of electrical power to an r-c network. When the operator disembarkes the train for any reason, the brake valve is cut out, such condition of the brake valve being sensed by the first pressure which to connect the energy from the charged capacitor of the r-c network to an application control relay via a second pressure switch that senses the cut off of brake pipe charging at the brake valve. A contact of the application control relay in a latching circuit connects power to the application relay to provide an electro-pneumatic brake application independently of the master controller and concurrently connects power to the application control relay via a normally closed contact of a release responsive relay to hold in the application control relay.

When the operator embarks the train, for example at the other control station when changing ends, the first and second pressure switches of the interface unit thereof are restored to their normal positions by cutting in the brake valve thereat and reestablishing the brake valve charging communication for brake pipe pressure. In this manner, the brake valve at the new control station is conditioned to release the brake application in effect. The resultant increase of brake pipe pressure is sensed by the master controller of the interface unit at the new control station to energize the release relay thereat and accordingly the release magnets on the cars of the train via the train-line release wire.

A release responsive relay in the interface unit of the original control station is energized via the release train-line wire to open its normally closed contact in the latching circuit of the application control relay to drop out the relay and thereby deenergize the application relay and accordingly the application train-line wire. Brake pipe pressure is thus assured of developing sufficiently to effect a brake release, so that the train can be operated from the new control station in accordance with normal operation.

BRIEF DESCRIPTION OF THE DRAWINGS

Other objects and advantageous features of the invention will become apparent from the following more detailed description when taken with the accompanying drawings in which.

DESCRIPTION AND OPERATION

Figure 1:
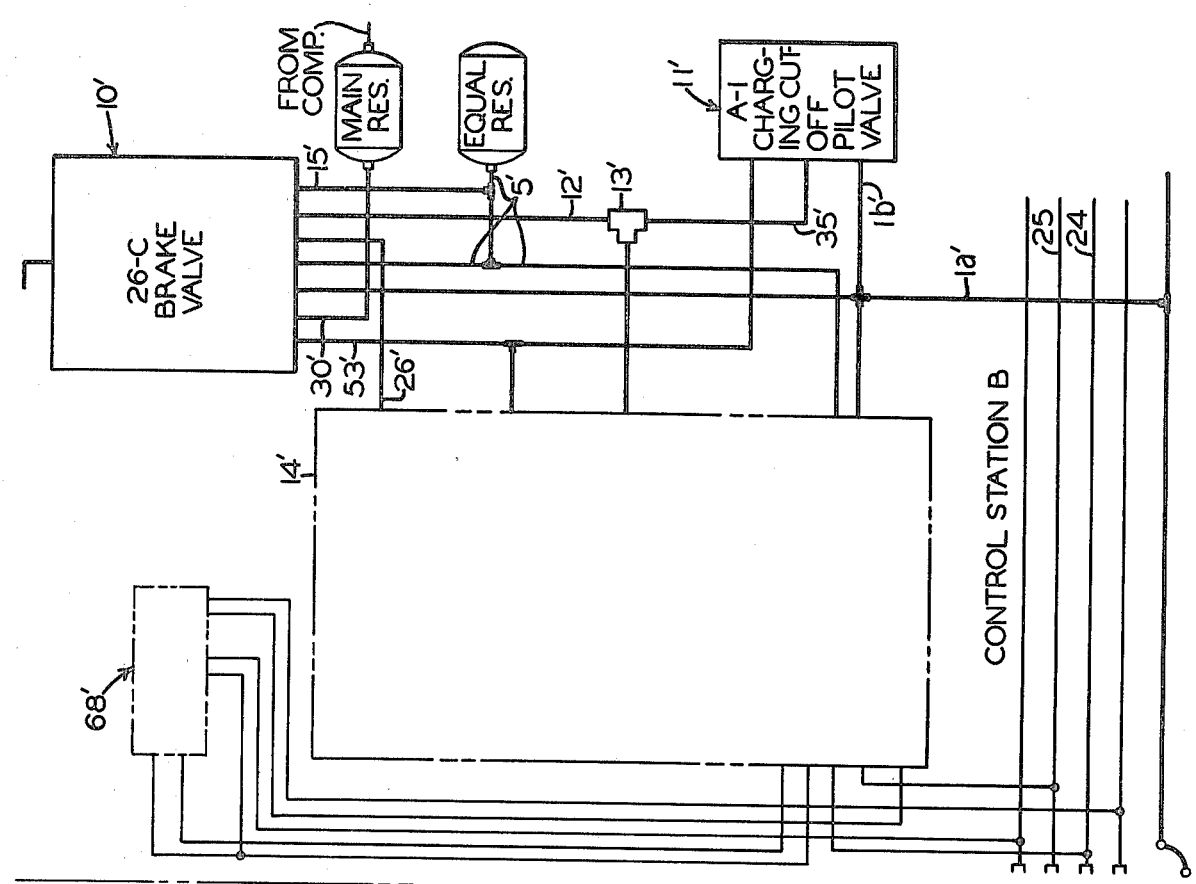
FIG. 1 shows a pneumatic/electro-pneumatic brake control system having an interface unit on each control car at the respective ends of a train operating in push/pull service.
Figure 1:
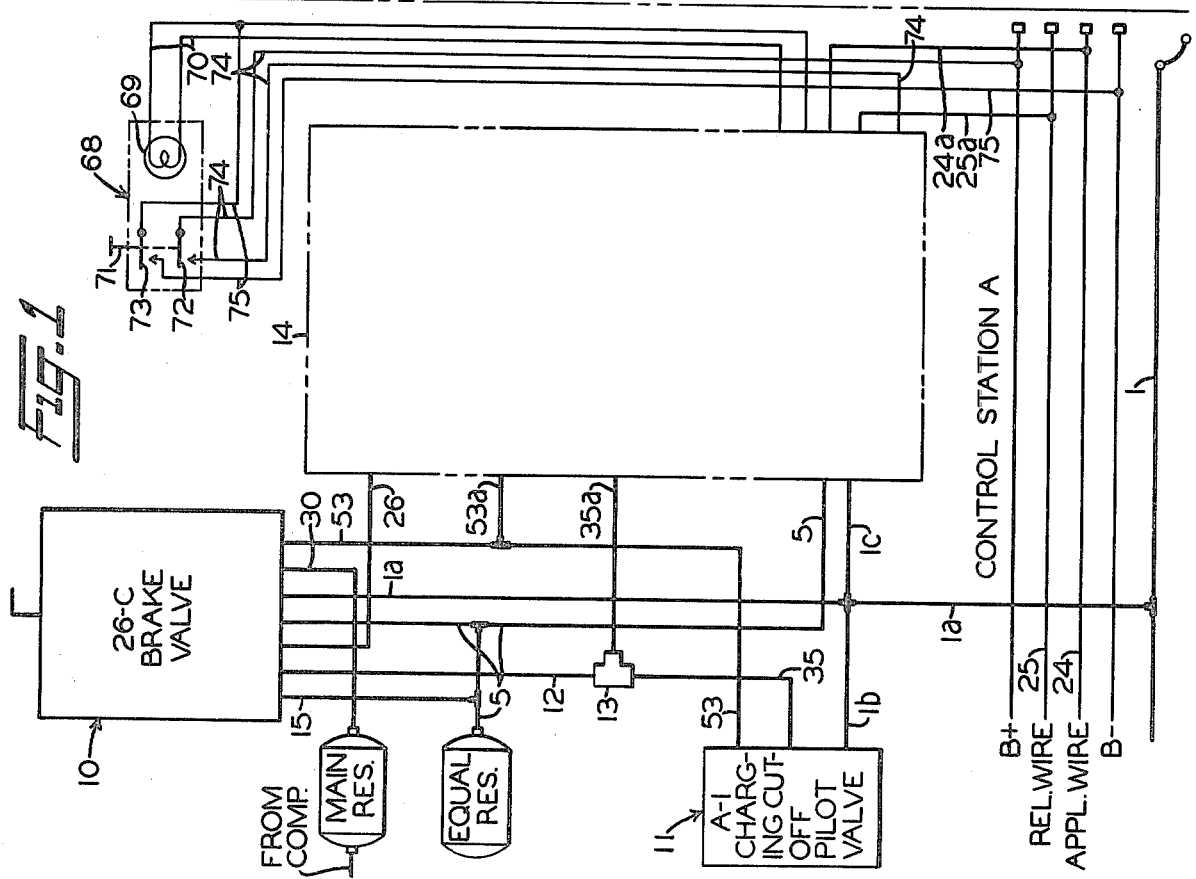

Railway trains operating in push/pull serivce, as hereinafter discussed with respect to an exemplary arrangement in which the present invention is used, employ a locomotive or control car at each end. Each control car, hereinafter referred to as control station A and control station B, is provided with identical brake control equipment, such as the conventional 26-L locomotive brake equipment shown and described in Westinghouse Air Brake Company Instruction Pamphlet G-g-5071-6. Since this equipment is well known to those skilled in the art, only those devices comprising this 26-L equipment needed for an understanding of the invention have been shown. Corresponding devices at the respective control stations are identified by identical reference numerals, the reference numerals associated with the devices of control station B being distinguished by a prime mark. Where applicable, these reference numerals are the same as the reference numerals referred to in the above-mentioned Instruction Pamphlet.

The 26-L brake equipment shown and described in the Instruction Pamphlet includes a 26-C type brake valve 10-10' (FIG. 1) to which is connected via pipe 30-30' a main reservoir that is maintained charged by the locomotive or control car compressor in a conventional manner. A brake valve of the above-mentioned type is also disclosed in U.S. Pat. No. 2,958,561. Main reservoir air pressure at each brake valve is converted to a regulated pressure, which flows by way of pipe 15-15' to an equalizing reservoir. This equalizing reservoir pressure is fed via pipe 5-5' back to the brake valve 10-10' where it serves as a handle-adjusted control signal from which the fluid pressure applied to train-line brake pipe 1 via branch pipe 1a-1a' is determined. The remaining pipe 12-12', 26-26' and 53-53' of brake valve 10-10' are pressurized at the time the brake valve is placed in emergency, handle-off, and charging cut-out positions, respectively, as is well known.

Also described in the above-mentioned Instruction Pamphlet is an A-1 Charging Cut-Off Pilot Valve identified in FIG. 1 by reference numeral 11-11', to which pilot valve a branch pipe 1b-1b' connects fluid pressure from brake pipe 1 and branch 1a-1a'. Pipe 53-53' is connected from brake valve 11-11' to the charging cut-off valve 11-11' while a pipe 35-35' is connected from the charging cut-off valve to one inlet of a double check valve 13-13', the other inlet of which is connected to pipe 12-12'.

Figure 2:
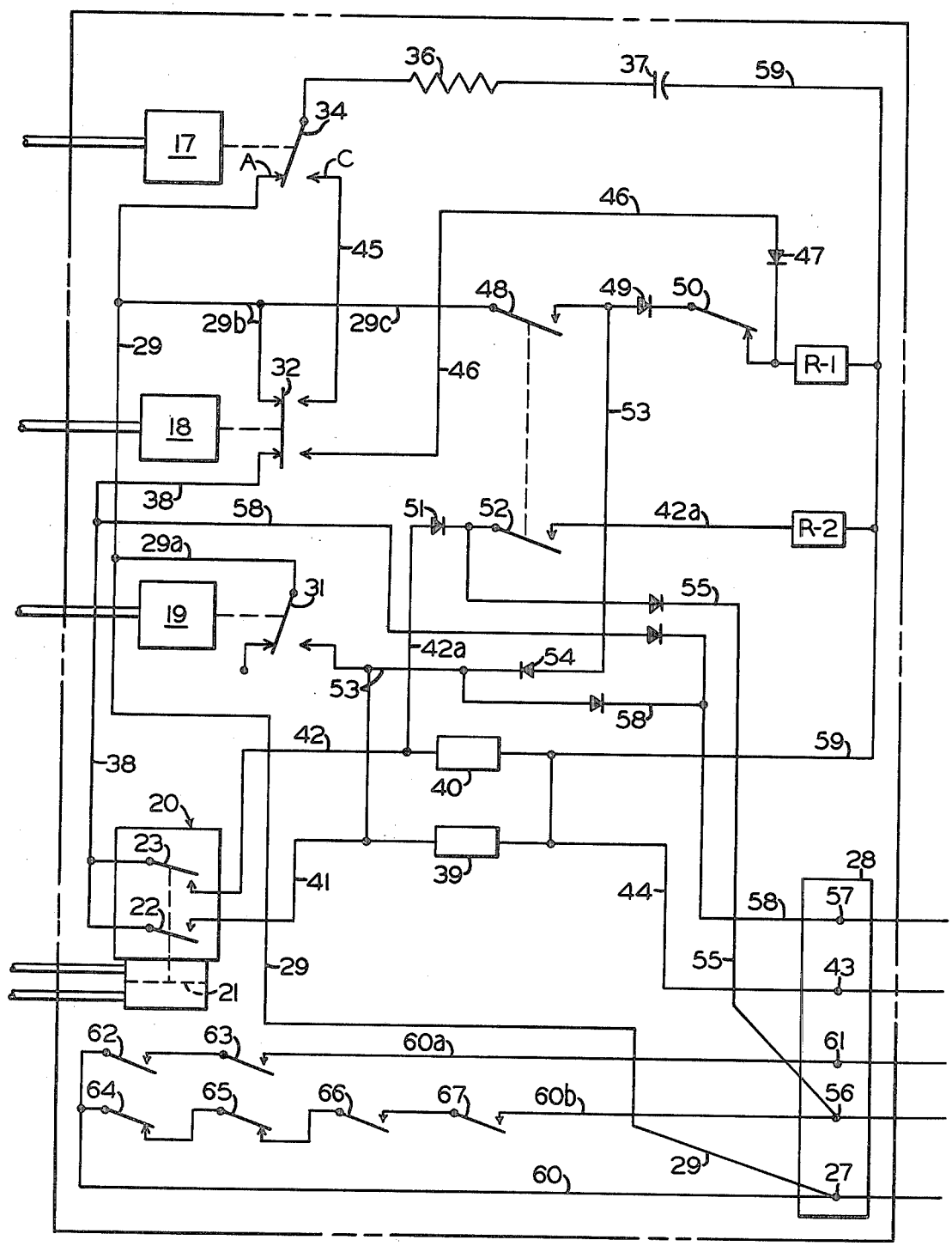
FIG. 2 shows a circuit diagrammatic of the interface unit of FIG. 1.

The respective control stations A and B further include an interface unit 14-14', the circuitry and associated components of which are shown in FIG. 2. The respective interface units 14-14' are identical and therefore only interface unit 14 associated with control station A will be described. This interface unit 14 comprises a pressure switch 17 to which pipe 26 is connected, a pressure switch 18 to which pipe 53 is connected via a branch pipe 53a, a pressure switch 19 to which a pipe 35a is connected from the outlet of double check valve 13, and a master controller device 20, which is shown and fully described in U.S. Pat. No. 3,573,409, issued Apr. 6, 1971 and assigned to the Westinghouse Air Brake Company. Since only a general knowledge of the manner in which this master controller operates is deemed necessary for an understanding of the present invention it need only be explained that pipe 5 is connected from the equalizing reservoir to master controller 20, where the equalizing reservoir pressure acts on one side of a diaphragm piston 21 (represented by dotted lines), to which a pair of switches 22 and 23 are operatively connected. The opposite side of diaphragm piston 21 is subject to brake pipe pressure connected thereto via branch pipes 1c and 1a. In the lap condition of the master controller, as shown, the contacts of switches 22, 23 are both open. A pressure differential resulting from a chosen predominance of brake pipe pressure over equalizing reservoir pressure results in upward deflection of piston 21 to effect closure of switch 22, while downward deflection of piston 21 responsive to a preselected differential in the opposite direction effects closure of switch 23.

Interface unit 14 further includes interlock circuitry associated with the mentioned pressure switches and master controller via which circuitry power is connected from the positive train-line wire B+ to effect energization of application and release train-line wires 24 and 25.

From a positive terminal 27 provided by terminal board 28 of interface unit 14, a supply wire 29 is connected to a switch member 31 of pressure switch 19 via branch wire 29a, to the switch member 32 of pressure switch 18 via branch wire 29b and to the normally closed contact A of switch member 34 of pressure switch 17. Switch member 34 is connected to an r-c network comprising a resistor 36 and capacitor 37 in series.

Branch wire 29b is connected via the normally closed front contacts of pressure switch 18 to a wire 38 that is connected to the master controller switch members 22, 23. The normally open contacts of these switch members 22, 23 are connected to the positive terminals of an application relay 39 and a release relay 40, respectively, via wires 41 and 42. The negative terminals of relays 39, 40 are connected to a terminal 43 of terminal board 28 via a wire 44.

A normally open contact C of pressure switch 17 is connected via a wire 45 to one terminal of the normally open back contacts of pressure switch 18, the other terminal of which is connected via wire 46 and a diode 47 to the positive terminal of a relay R-1. Also connected between the positive terminal of relay R-1 and wire 29b is a wire 29c containing a normally open contact 48 of relay R-1, a diode 49 and a normally closed contact 50 of a relay R-2 to provide a relay latching circuit. Relay R-2 is connected to wire 42 via a wire 42a containing a diode 51 and a normally open contact 52 of relay R-1. A wire 53 having a diode 54 is connected to the positive terminal of the application relay 39 from a junction of wire 29c between diode 49 and the R-1 relay contact 48. The normally open back contact C of pressure switch 19 is connected to wire 53 between diode 54 and the positive terminal of application relay 39. A wire 55 is connected between a negative terminal 56 of terminal board 28 and a junction of wire 42a between diode 51 and the R-1 relay contact 52.

Connected to a terminal 57 of terminal board 28 is a wire 58 that is connected to wire 38 and a branch wire 58a that is connected to wire 53. A wire 59 connects the negative terminal of capacitor 37, relays R-1, R-2, 39 and 40 to wire 44 and negative terminal 43 of terminal board 28.

Also connected from positive terminal 27 is a wire 60 having a branch wire 60a connected to a terminal 61 of terminal board 28 to which application wire 24 is connected via branch 24a and a branch wire 60b connected to terminal board terminal 56 to which release wire 25 is connected by branch wire 25a. Branch wire 60a includes normally open contact switches 62 and 63 of application relay 39 connected in series. Also connected in series in branch wire 60b are normally closed contact switches 64, 65 of the application relay 39 and normally open contacts 66, 67 of the release relay 40.

An indicator and power selector console 68-68' includes an indicator lamp 69 connected between terminals 57 and 42 by a wire 70 and a pushbutton switch 71 comprising normally open switch members 72 and 73 in wires 74 and 75. Wire 74 extends between the positive train-line wire B+ and terminal 27 of terminal board 28. Wire 75 extends between a negative train-line wire B− and terminal 43 of terminal board 28 via wire 70.

Although not shown, it is to be understood that application and release train-line wires 24 and 25 are connected at each car of the train to application and release magnet valve devices (not shown), which control the supply and release of the brake pipe fluid pressure in parallel with the operator's brake valve device 10-10' in a manner well known to those skilled in the art.

Assuming the train is being operated from control station A, interface unit 14 is activated by depressing pushbutton switch 71 of indicator and power control console 68, it being understood that in release position of the brake valve device 10, pressure switches 17, 18 and 19 are deactivated by the absence of pressure at pipes 26, 53 and 35. Accordingly, power is connected from train-line B+ to terminal board terminal 18 via closed contact member 72 of pushbutton switch 71. From terminal 18, power is connected to the respective switch members of pressure switches 17, 18 and 19 via wire 29.

At pressure switch 17, the normally closed contacts of switch member 34 complete a circuit to the train-line wire B− via resistor 36 and capacitor 37, wires 59, 44, terminal 43, wire 70, switch member 73 of console 68 and wire 75. Capacitor 37 is thus charged during periods of brake release.

At pressure switch 18, the normally closed contacts of switch members 32 connect power from wire 29 and branch wire 29a to wire 38 leading to the master controller switch members 22 and 23, which are both open in the normal lap position of the master controller.

When a brake application is desired, the brake valve handle is moved from release position into the service application zone in accordance with the degree of brake application intended. The consequent reduction of equalizing reservoir pressure at the brake valve, according to the well known brake valve operation, results in a reduction of brake pipe pressure thereat until the brake pipe reduction is sufficient to equalize brake pipe pressure with the equalizing reservoir pressure. Concurrently, piston 21 of master controller 20 senses the initial preponderance of equalizing reservoir pressure and moves to application position in which switch member 22 is closed. This completes a circuit from the closed master controller contact member 22 to train-line wire B− via wire 41, application relay 39, wire 44, terminal 43, wire 70, console switch member 73 and wire 75, thereby energizing the application relay. With application relay 39 energized, application relay contact switches 62 and 63 are closed to contact power from terminal board terminal 27 to application train-line wire 24 via wires 60, 60a, terminal 61 and branch wire 24a. The application magnet valves (not shown) on each car are thus energized to assist brake valve 10 in releasing brake pipe pressure. It is well known, of course, that such reduction of brake pipe pressure is sensed by car control valve devices (also not shown) to effect a brake application at the respective cars, such brake application occurring more rapidly due to the electro-pneumatic operation, as compared to straight pneumatic operation.

When the brake pipe reduction lowers the brake pipe pressure sufficiently to match the equalizing reservoir pressure, piston 21 of master controller 20 moves back to lap position in which contact switch 22 is opened to interrupt the supply of power to application relay 39, thereby deenergizing the application train-line wire and magnet valves.

In order to release the brakes, the brake valve handle is moved to release position in which the equalizing reservoir pressure is increased to a predetermined value. The resulting preponderance of equalizing reservoir pressure relative to brake pipe pressure at master controller 20 moves piston 21 to release position, in which contact switch 23 is closed. This completes a circuit from master controller 20 to train-line wire B− via wire 42, release relay 40, wire 44, terminal 43, wire 70, console switch member 73 and wire 75, thereby energizing the release relay. With release relay 40 energized, its contacts 66, 67 in wire 60b are closed to connect power from terminal 27 to the release train-like wire 25 via wires 60, 60b, terminal 56 and branch wire 25a. The release magnet valves (not shown) on each car are thus energized to assist brake valve 10 in charging the brake pipe. The resultant increase in brake pipe pressure is sensed by the car control valve devices to effect a brake release.

In the event an emergency brake application is made, either by moving the brake valve handle to emergency position or by reason of a break-in-two, either pipe 12 from brake valve 10 or pipe 35 from the charging cut-off pilot valve 11 is pressurized. Double check valve 13 connects the pressure from whichever one of these pipes 12,35 is pressurized to pipe 35a leading to pressure switch 19. Pressure switch 19 is accordingly activated to close its contact switch member 31, thereby connecting power from wire 29 and 29a to wire 53, application magnet 39, wire 44, terminal 43, wire 70, console switch member 73, wire 75 and train-line wire B−. In this manner, the application magnets on the respective cars are energized, as above discussed, but in bypass of master controller 20. The magnet valves thus remain energized for the duration of the emergency application, i.e., so long as pressure switch 19 is energized, in order to assure complete venting of brake pipe pressure.

The emergency application is released in the same way as a service brake application is released, as by moving the brake valve handle from emergency to release position, in response to which movement master controller 20 is operated to energize release relay 40.

Anytime power is connected to application relay 39 at the activated control station A, either by operation of master controller 20 during service applications or via operation of pressure switch 19 during emergency applications, power is also connected to the indicator lamp 69 via wires 53, 58a and 58, terminal 57 and wire 70. Illumination of indicator lamp 69 thus provides a visual indication of an electro-pneumatic brake application via the activated control station.

The application contact switches 64 and 65 in release wire 60b interrupts power supply to the release wire anytime the application relay 39 is energized to assure the ability to obtain a break-in-two or emergency application via pressure switch 19 in the event the master controller 20 is calling for a brake release at the time.

In push/pull type train operation, it is necessary for the train operator to change control stations at the end of each run prior to retracing the route. Upon leaving control station A to assume control from station B, the train brakes must be applied to prevent the train from "running away", while the operator is in the process of walking from one end to the other. This is accomplished, in accordance with standard operating procedures, by moving the handle of brake valve device 10 to handle-off position, in which position the brake valve handle may be removed to prevent anyone from releasing the brakes by operating brake valve 10 after the operator disembarks control station A. In addition, the brake pipe charging by brake valve 10 is cut out in the usual way. With the brake valve, accordingly, cut out and in handle-off position, pipes 53 and 26 are pressurized to actuate pressure switches 18 and 17. Switch member 34 of pressure switch 17 is thus engaged with contact C, while at the same time switch member 32 of pressure switch 18 is engaged with its back contacts. This establishes a circuit in which the energy stored in capacitor 37 is connected to relay R-1 via resistor 36, switch 34 of pressure switch 17, wire 45, switch 32 of pressure switch 18, wire 46 and diode 47. When relay R-1 is energized, its normally open contacts controlled by switch member 48 are closed to connect power from wire 29c, diode 49 and normally closed contacts of the R-2 relay switch member 50 to relay R-1 to "latch-in" the relay and thereby maintain relay R-1 energized after capacitor 37 is discharged. Wire 53 concurrently connects power from wire 29c to application relay 39, which effects energization of the train-line application wire 24 and application magnets associated therewith, as previously explained, to effect electro-pneumatic application of the train brakes.

Upon arrival at control station B, the operator activates indicator and power control console 68', attaches the handle previously removed from brake valve 10 to brake valve 10' and rotates the handle from handle-off position to release position, while also cutting in the brake valve to permit charging of the brake pipe to release the brakes. The initial increase of equalizing reservoir pressure relative to brake pipe pressure produced by movement of the brake valve handle to release position is sensed by master controller 11', which accordingly shifts to release position in which power is connected to the release relay of interface unit 14'. Consequently, release train-line wire 25 is energized, as previously explained relative to energization of release relay 40 of interface unit 14.

At control station A, power is connected from the energized release train-line wire 25 to relay R-2 via branch wire 25a, terminal 56, wire 55, the closed contacts of the R-1 relay switch 52 and wire 42. Energization of relay R-2 opens the normally closed contacts of its switch 50 to interrupt the "latching circuit" via which power is supplied to relay R-1. With relay R-1 consequently deenergized, its switch members 48 and 52 drop out, the latter positively interrupting energization of relay R-2, while the former allows the R-2 relay switch member 50 to reset to its normally closed condition. With switch member 48 of relay R-1 open, power from wire 29c to the application relay 39 is interrupted and accordingly the train-line application wire 24 and car magnet valves associated therewith are likewise deenergized. This terminates the venting of brake pipe pressure by the magnet valves at the respective cars, in accordance with the brake application previously initiated from control station A prior to the operator disembarking and permits the brake pipe pressure to build up in accordance with the pneumatic/electro-pneumatic brake release initiated at control station B upon the operator embarking the train and assuming control therefrom. It will be appreciated from the foregoing that an electro-pneumatic application of the train brakes may be obtained prior to leaving either control station and the application subsequently released from the opposite control station upon the operator's arrival thereat.

In the event the operator leaves the train, upon applying the train brakes from either control end, for instance from control station A, he may subsequently return to the same control station instead of boarding the train at the opposite control station and subsequently deenergize the application train-line wire to permit a brake release. This is accomplished by moving the handle of brake valve 10 to release position, to in turn effect actuation of master controller 20 to release position, in which position power is connected to relay R-2 via wire 42, branch wire 42a, diode 51 and the closed R-1 relay contact switch. With energization of relay R-2, the application train-line wire and application magnets are deenergized in the same fashion as explained relative to a brake release after changing control stations.

Having now described the invention, what we claim as new and desire to secure by Letters Patent, is:

1. In a train arranged for dual station control, a combined pneumatic and electro/pneumatic brake control system comprising:
   (a) a brake pipe extending through said train, the variation of pressure in said brake pipe controlling the brakes on said train;
   (b) an equalizing reservoir at each control station;
   (c) a brake valve device at each control station comprising:
      (i) an operating handle movable from a brake release position to a brake application zone, in which said equalizing reservoir at the same control station as said brake valve is charged with fluid pressure according to the position of said handle in said brake application zone;
      (ii) relay valve means subject to the fluid pressure effective at said equalizing reservoir at the same control station as said brake valve for controlling the fluid pressure in said brake pipe; and
   (d) a master controller device at each control station subject opposingly to the pressures in said brake pipe and said equalizing reservoir at the same control station as said master controller, and having application and release switches each open in the absence of a pressure differential between said brake pipe and equalizing reservoirs, one or the other of said switches being closed when a pressure differential arises between said brake pipe and equalizing reservoir depending upon the sense of said pressure differential;
   (e) a brake application wire extending through said train and energized by closure of said application switch to provide electrical control of said brake pipe pressure so as to effect variation thereof in a first sense;
   (f) a brake release wire extending through said train and energized by closure of said release switch to provide electrical control of said brake pipe pressure so as to effect variation thereof in a sense opposite said first sense;

(g) a source of electric power;

(h) interlock circuitry at each said control station, one of said control stations having said source of power connected thereto, said interlock circuitry comprising:

(i) pressure switch means for connecting power from said interlock circuitry at said one control station to said master controller switches thereat when said brake valve at said one control station is activated and for energizing said brake application wire in bypass of said master controller application switch only when said brake valve at said one control station is deactivated; and (ii) means for deenergizing said brake application wire responsive to energization of said brake release wire.

2. A combined pneumatic and electro-pneumatic brake control system, as recited in claim 1, wherein said brake valve further comprises:

(a) said handle having a handle-off position; and (b) cut-off valve means for interrupting the variation of pressure in said brake pipe by said relay valve means, said brake valve being deactivated only when said handle is in said handle-off position and said cut-off valve means is actuated to interrupt the variation of pressure in said brake pipe by said relay valve means.

3. A combined pneumatic and electro-pneumatic brake control system, as recited in claim 2, further comprising:

(a) said brake valve handle having an emergency position in which a first pressure signal is provided;

(b) mans for detecting a train break-in-two to provide a second pressure signal; and (c) said interlock means further comprising emergency pressure switch means for energizing said brake application wire when either one of said first and said second pressure signals are present.

4. A combined pneumatic and electro-pneumatic brake control system, as recited in claim 3, wherein said interlock means further comprises:

(a) an application relay to which said pressure switch means, said emergency pressure switch means and said application switch of said master controller are connected in parallel, said application relay having a normally open contact in said brake application wire and a normally closed contact in said brake release wire; and (b) a release relay connected to said release contact of said master controller and having a normally open contact in said brake release wire in series with said application relay contact therein.

5. A combined pneumatic and electro-pneumatic brake control system, as recited in claim 4, wherein said interlock circuitry further comprises:

(a) a terminal board to which said source of power is connected at said one control station;

(b) an r-c network having a resistor and capacitor in series; p0 said pressure switch means including:

(i) a first pressure switch subject to a third pressure signal representative of said brake valve handle being in handle-off position and having a normally closed contact via which the capacitor of said r-c network is charged from said source of power at said terminal board in the absence of said third pressure signal;

(ii) a second pressure switch subject to a fourth pressure signal representative of said actuated condition of said cut-off valve means and having normally closed contacts via which said source of power at said terminal board is connected to said master controller switches in the absence of said fourth pressure signal; and (d) a first relay having a normally open first contact thereof in a latching circuit via which said source of power at said terminal board is connected to said first relay, said first and second pressure switches having normally open contacts in series via which said capacitor is connected only in the presence of both said third and said fourth pressure signals to momentarily energize said first relay, said brake application relay being energized via said contact of said first relay.

6. A combined pneumatic and electro-pneumatic brake control system, as recited in claim 5, wherein said interlock circuitry further comprises a second relay having a normally closed contact in series with said first contact of said first relay, said first relay having a normally open second contact via which said brake release wire is connected to said second relay when said first relay is energized to effect energization of said second relay when said brake release wire is energized to thereby open said contact of said second relay to interrupt the supply of power to said first relay from said terminal board and accordingly effect deenergization of said brake application relay.

7. A combined pneumatic and electro-pneumatic brake control system, as recited in claim 5 or 6, further comprising selector switch means at each control station for connecting said source of electric power to said terminal board of the respective one of said interlock circuits.

8. A combined pneumatic and electro-pneumatic brake control system, as recited in claim 7, further comprising an indicator light in circuit with said selector switch means and said brake application relay for providing an indication of an electro-pneumatic brake application.

* * * * *

UNITED STATES PATENT AND TRADEMARK OFFICE
CERTIFICATE OF CORRECTION

PATENT NO. : 4,181,369
DATED : January 1, 1980
INVENTOR(S) : Robert F. Balukin and John R. Reiss It is certified that error appears in the above-identified patent and that said Letters Patent are hereby corrected as shown below:

Column 10, line 7, delete "p0 said pressure switch means including:"

between lines 7 and 8, insert

--(c) said pressure switch means including:--

Signed and Sealed this

Seventeenth Day of June 1980

[SEAL]

Attest:

SIDNEY A. DIAMOND

Attesting Officer

Commissioner of Patents and Trademarks